United States Patent [19]

Schrader

[11] 4,439,028
[45] Mar. 27, 1984

[54] PROJECTOR ASSEMBLY

[76] Inventor: Hellmut Schrader, Am Hüttenkrug 12, D-3057 Neustadt 1, Fed. Rep. of Germany

[21] Appl. No.: 361,971

[22] Filed: Mar. 25, 1982

[51] Int. Cl.³ ............................................. G03B 21/30
[52] U.S. Cl. .................................................... 353/119
[58] Field of Search ................... 353/119, 122, 72, 73, 353/17; 352/242, 243; 248/600, 651, 669, 579, 359; 355/19; 224/218, 202, 250, 908; 294/139, 149, 31.2; 150/74, 12, 33, 52 J; 190/57, 58 A, 58 R

[56] References Cited

U.S. PATENT DOCUMENTS

| 492,808 | 3/1893 | Jenkins | 248/579 |
|---|---|---|---|
| 1,302,800 | 5/1919 | Jenkins | 352/243 |
| 2,313,593 | 3/1943 | Smith | 224/908 X |
| 2,341,223 | 2/1944 | Lillie . | |
| 2,835,176 | 5/1958 | Land | 224/908 X |
| 3,049,971 | 8/1962 | Pester . | |
| 3,221,598 | 12/1965 | Hall | 353/122 X |
| 3,699,252 | 10/1972 | Jackson | 352/243 X |
| 3,823,891 | 7/1974 | Schrader . | |
| 3,880,507 | 4/1975 | Adams, Jr. | 353/119 X |

FOREIGN PATENT DOCUMENTS

| 290138 | 2/1916 | Fed. Rep. of Germany . | |
| 401701 | 10/1921 | Fed. Rep. of Germany | 353/43 |
| 2607950 | 9/1977 | Fed. Rep. of Germany . | |
| 1373973 | 8/1964 | France . | |
| 2041352 | 7/1971 | France . | |
| 218509 | 4/1942 | Switzerland . | |
| 892809 | 3/1962 | United Kingdom . | |

Primary Examiner—Harry N. Haroian
Attorney, Agent, or Firm—Spencer & Frank

[57] ABSTRACT

A projector assembly including a projector containing a light source, light channels, lens, film drive and ventilation, a base supporting the projector and containing an energy supply and control devices and circuits for film movement and adjustment of focus, and a hood adapted to be placed over the projector and connected together with the base to form a closed case for the projector.

12 Claims, 9 Drawing Figures

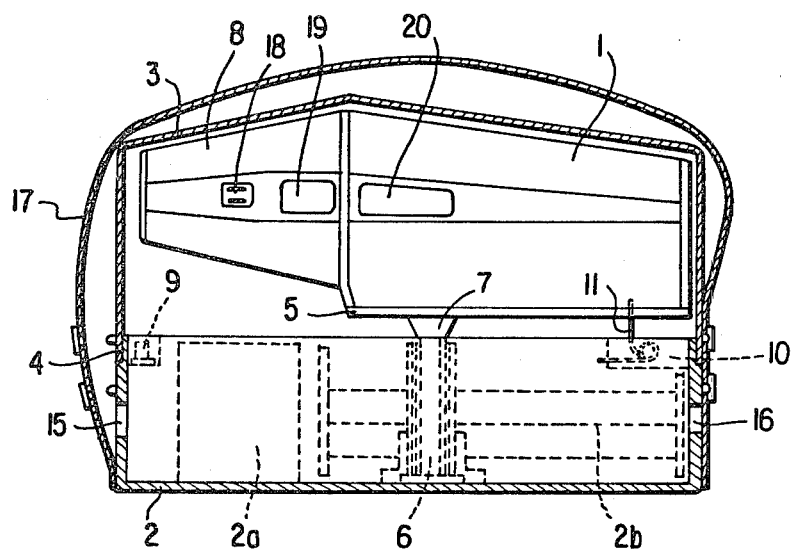
FIG. 1
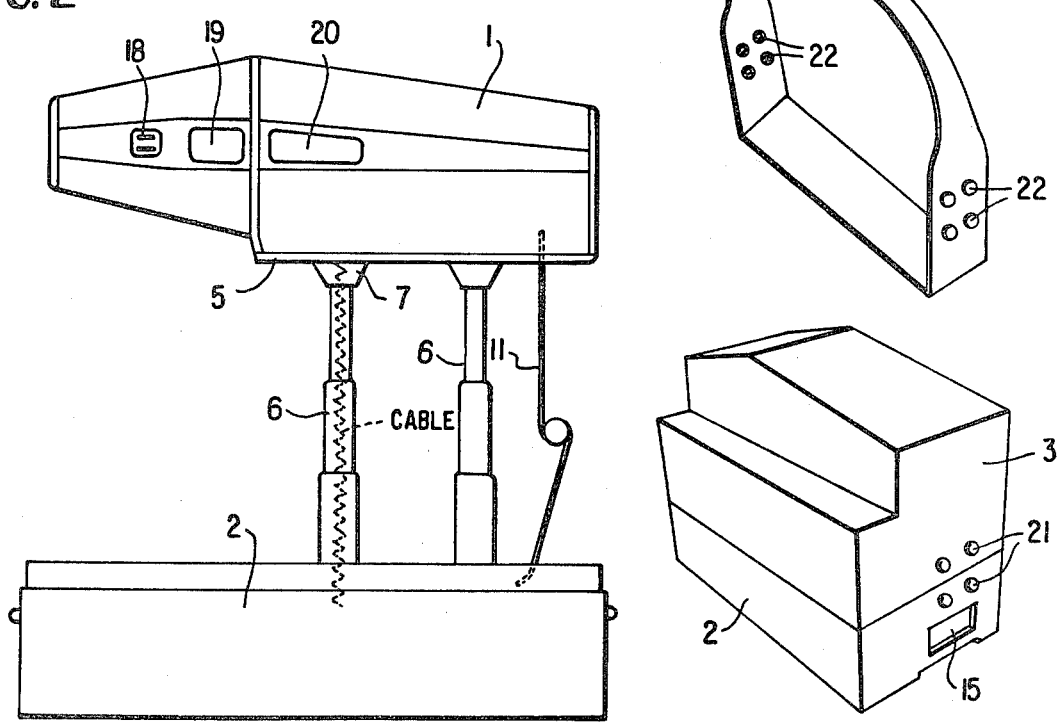
FIG. 2
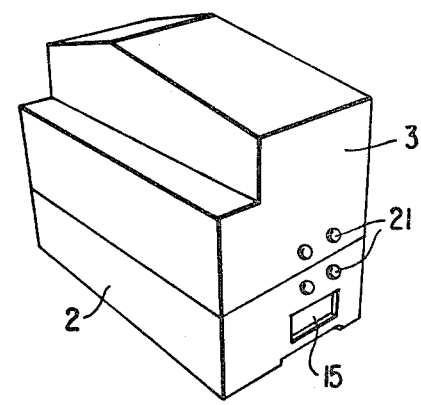
FIG. 3
FIG. 4

PROJECTOR ASSEMBLY

BACKGROUND OF THE INVENTION

The present invention relates to a projector for films, slides or the like including a base supporting the projector and a cover that can be placed over the projector and connected with the base to form a closed carrying case. In known projectors of this type the base comprises a plate with mounts for the projector, and also hooks, projections or the like for engagement of locking members in the hood. The projector is a structural unit which includes all parts required for its operation, such as energy supply, light source, optics, etc., and can also be operated when removed from the base. Such projectors are usually rather heavy. It is also known to provide slide projectors with magazines and to project the slides successively by remote control while varying the focus. Such projectors are complicated and are usually separated into separate cases. For operation they are placed onto special tables. Height adjustment in the projected image is usually effected by changing the angular position of the projector and this produces trapezoidal errors.

SUMMARY OF THE INVENTION

It is an object of the present invention to provide a projector which can be operated from its case by simply removing the hood. It is also an object to provide a projector that has such a small weight that it can be operated with undercarriages of lightweight construction and can be placed at the desired height without the expenditure of great force.

According to a preferred embodiment of the invention a projector assembly is provided comprising a projector supported by a base and having a hood adapted to be placed over the projector and connected together with the base to form a closed case around the projector. In the projector are disposed the light source, light channels, lens, film drive and ventilation as well as other devices necessary for example to move and focus the film or slides; while the base accommodates the energy supply and removable control devices for film movement and adjustment of focus. In another aspect of the invention the projector is adjustable in height relative to the projector by one or more telescoping legs. By using a continuous or stepless film drive, even for slide projection, undisirable additional forces acting transversely on the support for the projector are avoided.

Various other objects and advantages will appear from the following detailed description taken in conjunction with the accompanying drawing, and the novel features will be particularly pointed out in the appended claims.

BRIEF DESCRIPTION OF THE DRAWINGS

FIG. 1 is longitudinal sectional view of a projector according to a preferred embodiment of the invention.

FIG. 2 shows the projector of FIG. 1 in its operating position.

FIGS. 3 through 8 show detail views of the projector of FIGS. 1 and 2 and various ones of its components.

DESCRIPTION OF THE PREFERRED EMBODIMENTS

Figure 5:
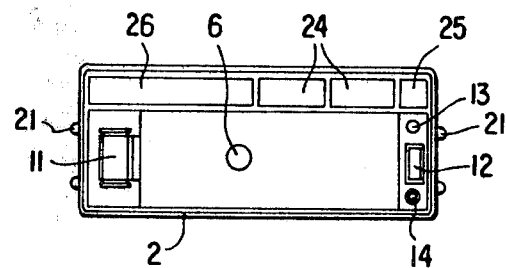

FIG. 1 shows a projector 1 which is packed for transport and includes a base 2 and a hood 3 which is placed over the projector 1 and is releasably fastened to the upper side 4 of the base 2. The projector 1 includes a light source, light channels or paths, lens film drive and ventillation and the like, which are necessary to move and focus the film or slides, respectively. The base 2 accommodates the energy supply 2a and removable control devices and control circuits 2b for film movement and adjustment of focus. They are provided concentrated in the base 1 or removably attached on the base 1 power supply and control means which with known apparatus are usuably distributed over the whole apparatus.

The projector 1 is disposed in the base 2 so as to be adjustable in height. For this purpose, the projector 1 is mounted directly or via a cover plate 5 on a telescoping leg 6 which is fastened in the base 2. The telescoping leg 6 is infinitely adjustable to any length between its closed and opened positions. The projector is shaped in such a way that its center of gravity is intersected by the axis of the telescoping leg 6. Alternatively, the projector may be supported on a plurality of telescoping legs each having one end mounted in the base 2. The cover plate 5 may also be supplemented or replaced by appropriate design of the telescoping upper portion 7. Within the telescoping leg 6 there may be provided control and current cables. Height adjustment is possible either manually or by remote control. The parts of telescoping leg are resiliently locked e.g. by a lot of springs arranged inside the leg and gliding on the parts. Further, there can be attached to the legs resilient sleeves surrounding the parts. The sleeves can be made of e.g. plastic.

Between the base 2 and the optics 8 of the projector 1, there is provided an area which can be utilized for the accommodation of, for example, a cable such as the power supply. Below the cover plate 5, the base 2 is adapted to provide a receptacle 10 for accommodating a connecting cable 11. The connecting cable 11 is preferably designed to be self-winding and thus always adapts itself to the height position of the projector 1 relative to the base 2. The cable is designed as a bifilar, flat, band cable. At the frontal face of the base 2, an area 9 is provided to accommodate the power switch 12, the fuse or circuit breaker 13 as well as further setting means 14 (see FIG. 5). The base 2 is provided with openings 15, 16 to receive power plugs or remote controls plugs, respectively. In the packed state, these openings are covered by carrying and connecting strap 17. Hood 3 and base 2 are designed in such a manner that together they form a closed case which encases the projector 1 and the interior of the base. The hood 3 may be provided with a carrying handle. At both sides of is front end, the projector 1 is provided with sensor switches 18 for the film intake drive, so as to switch the film for clockwise or counterclockwise movement, depending on whether the cassette containing the film is inserted in the right or left-hand receptacle 19. In the rear portion of the projector 1 a gripping recess 20 is provided which is intended to facilitate the manual raising of the projector. This recess 20 may simultaneously be provided with vertical ventilation bores.

FIG. 2 shows the projector 1 with the hood 3 removed and in the operating position with the telescoping leg 6 extended. The wound bifilar flat band cable 11 is wound up in FIG. 1 and unwound in FIG. 2.

Instead of such a flat band cable 11 or in addition thereto, a variable length cable of suitable design may also be provided within the telescoping leg 6.

The projector 1, when elevated according to FIG. 2, can be rotated manually or by means of a motor about the axis of the telescoping leg 6. The telescoping leg as well as the cable 11 or a cable disposed inside the telescoping leg permit such rotation without additional structural measures. With motor-driven adjustments, the additional expenditures can be kept relatively low.

FIG. 3 shows the strap 17 with fastening studs 22 which cooperate with corresponding snaps in the base 2 and hood 3. During operation of the projector, the strap 17 is removed completely.

FIG. 4 shows the design of the closed case 2, 3 without strap 17. In this illustration the snaps 21 which cooperate with the fastening studs 22 are clearly visible as is the recess in the bottom of the base 2 for fixing the position of strap 17.

FIG. 5 is a top view of the base 2. In addition to elements already discussed, FIG. 5 also shows areas 24 intended for cassette boxes or containers for cassette of uncut film as disclosed in German Patent Application P 21 55 521, area 25 for one or a plurality of empty cassettes and area 26 for a remote control device (not shown).

Figure 6:
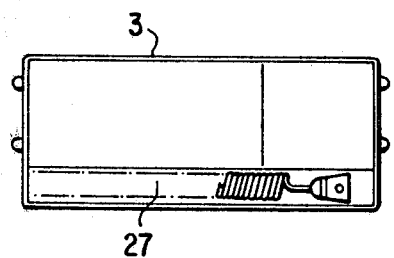

FIG. 6 is a bottom view of the hood 3 showing an area 27 for a power cord.

Figure 7:
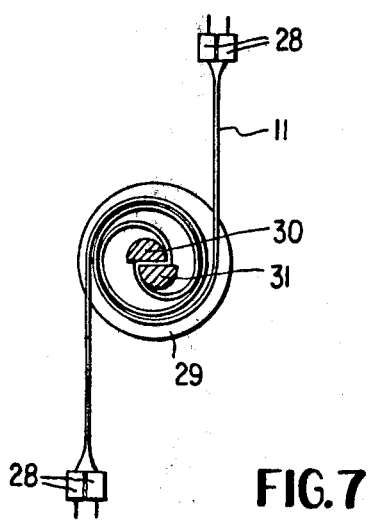
Figure 8:
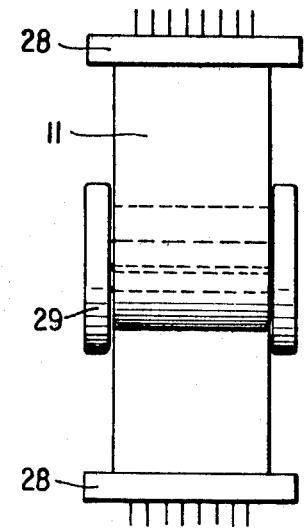

FIGS. 7 and 8 are two side views showing the rolled up cable 11 with plugs 28 and lateral guides 29. Strips 30 and 31, fixed between guides 29, enclose the center portion of the cable 11, which is continuous between the plugs 28, in such a manner that when relaxed, the cable 11 will automatically wrap around the strips and roll itself up. The distance between the guides 29 corresponds approximately to the width of the cable.

It will be understood that various changes in the details, materials and steps which have been described herein to explain the nature of the invention may be made by those skilled in the art within the principle and scope of the invention as expressed in the appended claims.

What is claimed is:

1. A projector assembly comprising: a projector having disposed therein a light source, light paths, lens, film drive and ventilation; a base supporting said projector and having disposed therein an energy supply and control means for film movement and adjustment of focus; electrical connecting means connecting said projector and said base; at least one adjustable telescoping leg with one end mounted in said base and the other end connected to said projector for adjusting the height of said projector relative to said base; and a hood adapted to be placed over said projector and connected with said base to form a closed case for said projector when said at least inetelescoping leg is in its contracted position.

2. A projector assembly as defined in claim 1, wherein said electrical connecting means includes at least one cable connected between said base and projector, and wherein said at least one cable is disposed in said at least one telescoping leg and the length of said at least one cable changes with the length of said at least one telescoping leg.

3. A projector assembly as defined in claim 1, further comprising a supporting plate via which said at least one telescoping leg is connected with said projector.

4. A projector assembly as defined in claim 1, wherein said at least one telescoping leg has an opened position and a closed position and is infinitely adjustable between said closed and open positions.

5. A projector assembly as defined in claim 1, wherein said electrical connecting means includes a connecting cable in the form of a bifilarly wound, flat, band cable having parallel extending individual wires, and wherein said cable is connected between said projector and said base and said cable is wound up or down according to the change in distance between said projector and said base.

6. A projector assembly as defined in claim 1, 2, 3 or 4, further wherein said base has disposed therein receptacle areas for the accommodation of cables and switches.

7. A projector assembly as defined in claim 1, wherein there is only one said telescoping leg supporting said projector and said projector is shaped in such a manner that its center of gravity is intersected by the axis of said one telescoping leg.

8. A projector assembly as defined in claim 1, 2, 3 or 4, further comprising a carrying strap adapted for carrying said projector and wherein said base is provided with openings for receiving electrical plugs and said carrying strap covers said openings when disposed for carrying said projector.

9. A projector assembly as defined in claim 8, wherein said carrying strap is a closed strap having a bottom portion and said base is adapted to rest on said bottom portion of said strap.

10. A projector assembly as defined in claim 9, further comprising snap connections on said hood and said base as well as at corresponding parts of said carrying strap for connecting said strap to said hood and said base.

11. A projector assembly as defined in claim 1, wherein said at least one telescoping leg comprises a plurality of telescoping legs.

12. A projector assembly as defined in claim 1, wherein said projector has an optical axis and said telescoping leg is connected to said projector so that the inclination of the optical axis relative to said base is fixed.

* * * * *